3,745,019
PREPARATION OF PRE-FRIED FOOD PRODUCTS
Charles C. Huxsoll, El Cerrito, and Douglas N. Hommick, Berkeley, Calif., assignors to the United States of America as represented by the Secretary of Agriculture
Filed Sept. 24, 1971, Ser. No. 183,493
Int. Cl. A23l 1/10
U.S. Cl. 99—83
15 Claims

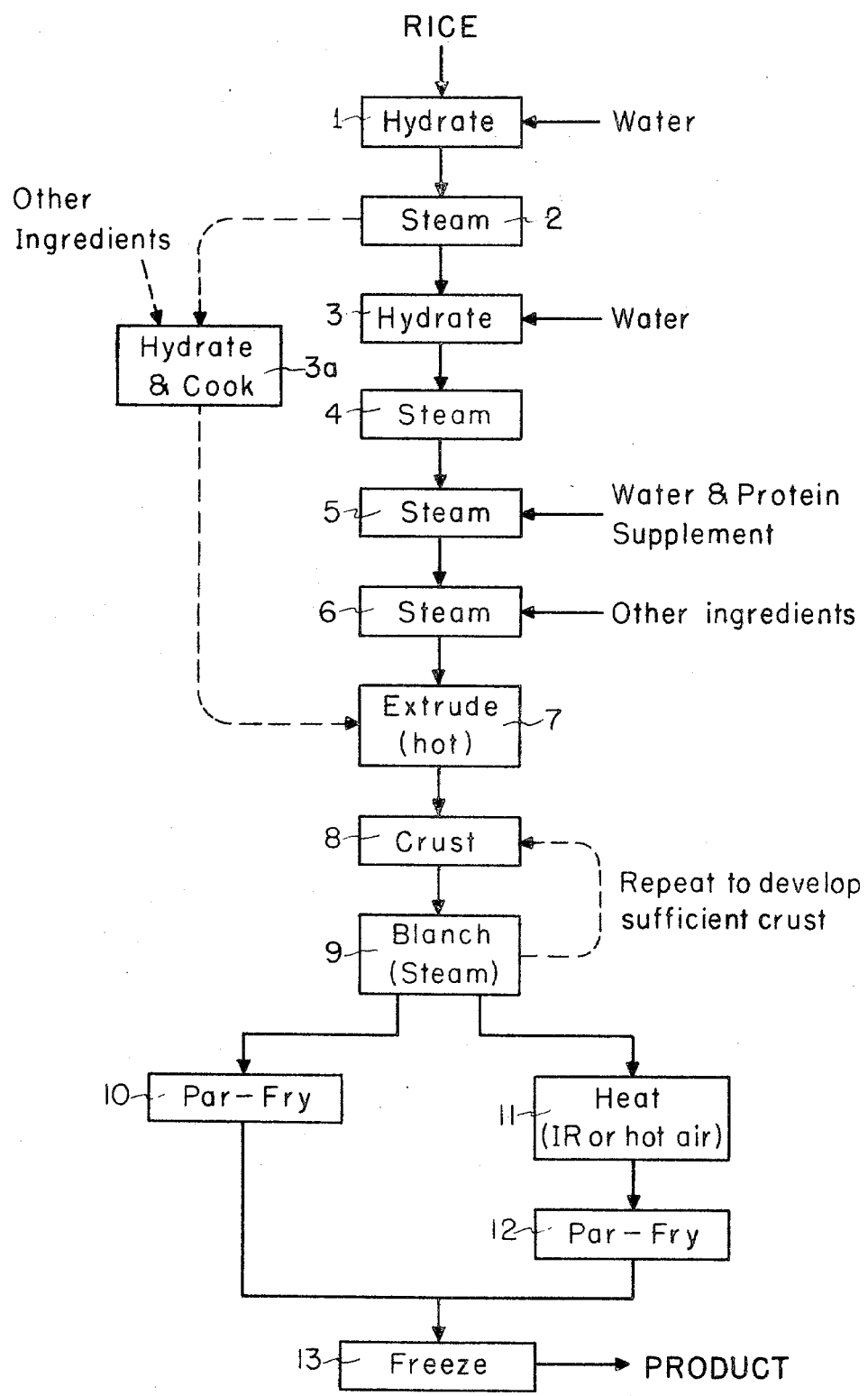

ABSTRACT OF THE DISCLOSURE

Novel pre-fried food products are prepared from grains such as rice, wheat, oats, barley, corn, and the like, by (a) mixing the partially cooked grain with water, protein supplements, spices, seasonings, and other edible foods, (b) steaming the so-mixed ingredients, (c) shaping said mixture into a conveniently dispensible form, e.g., rods, slabs, patties, etc., (d) coating the so-formed material with a crust, and (e) par-frying the so-coated pieces.

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of novel pre-fried food products prepared from grains, and novel processes for making them. Further objects of the invention will be evident from the following description wherein parts and percentages are by weight unless otherwise specified.

In the remainder of this description the preparation of pre-fried rice products will be discussed. This particular embodiment of the invention is for the purpose of illustration and should not be construed as a limitation. In its broad ambit the invention can be applied to the production of pre-fried food materials from all types of grains including barley, wheat, oats, corn, millet, and the like.

The annexed drawing is a flow sheet illustrating the procedures of the invention.

The primary object of the invention is the provision of novel pre-fried food products and processes for making them. Basically, the objects of the invention are attained by applying the following operations:

(1) Raw rice is hydrated to a moisture content of about 30% by soaking in excess water and, then, gelatinized and partially cooked by the application of steam. Repetition of the aforesaid processes serves to further hydrate (to a moisture level of about 65%), gelatinize, and cook the rice. At this point, the twice-hydrated rice is mixed with additional water; and protein supplements such as soy flour, etc., are added to increase the nutritional value of the product. The incorporation of such material helps to improve the protein to carbohydrate ratio. Said mixture is then further cooked by the use of steam. Finally, additional ingredients such as spices, seasonings, and other food materials are added, and the resulting conglomeration is held to aid flavor development and intermittently steamed to maintain the high temperature and to finish the cooking process. Alternately, the second hydration, rather than being a distinct step, can be included in the step which involves mixing and cooking the rice with a protein supplement and other ingredients. It is important to note, however, that the initial hydration must be conducted separately so that the rice in the final product will have the proper texture.

Since the rice is very bland, the mixture can be effectively flavored and seasoned. In addition, the spicy flavors can be used to mask any undesirable taste resulting from the protein supplement.

By-products from the production of other food products such as meat, fish, poultry, etc., can be used to supplement the flavor of the rice material, thereby enhancing its value as a dish for breakfasts, lunches, or dinners.

Thus, for example, the filling for a chili-flavored pre-fried rice product is prepared as follows: Onion, garlic, bell pepper, ginger, chili powder, bits of beef, tomato paste, salt, monosodium glutamate, and pinto bean powder are incorporated with pre-cooked rice and further cooked to increase the flavor and texture of the whole. It is important to note that the texture of the cooked rice mixture must be such that the final product exhibits a soft, but not mushy, inner core. By application of the above steps, the proper texture can be attained.

(2) The cooked material, either hot or warm, is extruded such that uniform, dispensable pieces are obtained. It should be obvious that the shape is unimportant. Thus, the material can be molded into such forms as rods, cylinders, patties, balls, ribbons, slabs, and the like.

(3) Next, a thin layer of flour is applied to the surface of the pieces. The layer is set by blanching with steam which partially cooks the flour and insures the formation of a crisp crust. This cooking operation is essential to the production of a crust which will adhere to the product during subsequent frying operations. The flour for the crust may be selected from a wide variety of sources such as potatoes, beans, wheat, etc. The important criterion is that a crust of desirable color, flavor, and texture is produced. The flour may be flavored with various spices and seasonings before application to the pre-formed rice product.

One advantage of the crust is that its crispness provides an effective and desirable contrast to the soft inner core. Also, control of the type of crust produced will insure that the pre-fried and frozen material will yield a desirable product upon oven-warming by the consumer. Another advantage of the crust is that oil, used in subsequent frying operations, is prevented from moving to the interior of the pieces. Thus, the oil content of the finished product will be maintained on the surface and at a minimal level. A further advantage is that the crust shields the kernels of rice during frying operations so that they remain moist and soft. Small amounts of special film-forming starches may be added to the crust mix to enhance its functional character. Above all, the steps of coating with flour and blanching can be repeated until a crust of a desirable thickness is achieved.

(4) Finally, the so-formed pieces are par-fried in an edible oil to develop the proper flavor, color, and texture, and to slightly reduce the moisture level of the whole. Alternately, the pieces may first be exposed to infrared heat or hot air to partially cook the crust. The former is preferred because it produces a better quality crust. However, treatment with hot air is a much simpler operation and might be the method of choice for larger operations. Obviously, prior treatment with radiant heat or hot air will reduce the length of the aforementioned par-fry. In addition, the pre-developed crust will prevent the uptake of excess oil during the shortened par-fry.

The primary advantage of the invention is the production of pre-fried food products which serve as an alternate to pre-fried potato products. Thus, as with potato chips, the products of the invention can be used as snack items at parties, etc. On the other hand, said products can be served as part of a meal in much the same way as French-fried potatoes, hash-brown potatoes, and the like are used. An important aspect of the invention is its versatility in composition and use. Virtually any type of flavored product can be prepared.

Another advantage of the process is that products of almost any desired moisture level can be prepared, provided that sufficient water is added to make the grains soft enough to be palatable. On the other hand, fresh potatoes are only about 20% solids material. Thus, to make a high solids potato product, large amounts of water must be evaporated. Such a process requires a large expenditure of heat and is, therefore, costly. Moreover, cereal grains are usually less expensive than fresh potatoes, so that formed products from cereal grains have an economical advantage over those from potatoes.

The practice of the invention is next described in detail having reference to the annexed drawing.

Raw rice is fed into hydrator 1 wherein it is contacted with excess water at 70–140° F. for about 10–30 minutes to effect an approximately 30% moisture level. A temperature greater than 140° F. is avoided so that premature gelation of the rice does not occur. Gelation usually is promoted at temperatures above 160° F. It should be obvious that the length of this soaking period will depend on the temperature of the water, less time being required for hydration with warm water.

The partially hydrated rice is separated from excess water and steamed at 212° F. in cooker 2 for about 5–10 minutes. This process gelatinizes and partially cooks the rice and prepares it for the uptake of more water.

It is a critical feature of the invention that the aforesaid step is performed separately. Attempts to hydrate, gelatinize, and cook the rice and other ingredients in one step produced a mushy paste which led to a highly undesirable product. Good gelatinization can be accomplished only when the internal moisture level of the rice is about 30% before the application of steam. In addition, the initial step of soaking and steaming insures that the kernels of rice retain their integrity during the remainder of the preparation.

The so-treated rice is directed to hydrator 3 wherein the moisture level is increased to about 65% by standing with excess water at 70–190° F. for approximately 10–20 minutes.

The twice-hydrated rice is then separated from excess water and steamed for 5–10 minutes at 212° F. in cooker 4. This step is not critical and can be omitted.

The partially cooked rice is mixed with water and the protein supplements and is further cooked with steam at 212° F. for about 5–10 minutes in cooker 5.

Next, the rice is mixed with other ingredients, held for 5–20 minutes, and intermittently steamed in cooker 6 at 212° F. to maintain the high temperature and to complete the cooking and flavoring processes.

Alternately, the individual steps in 3 through 6 may be accomplished in one step. In accordance with this particular embodiment of the invention, the rice from steamer 2 is intermittently stirred with piece-form materials, such as bell pepper and the like, in warm water at 180–210° F. in 3a and the temperature is maintained at 180–210° F. for 5–10 minutes. The quantity of water added should be adjusted such that the desired final moisture level is obtained. Then, the protein supplement and other ingredients (except for bean powders) are added and the mixture is held at 180–212° F. for 7–10 minutes with slow or intermittent stirring. Finally, the bean powder is added and the holding and stirring at 180–210° F. are continued for an additional 2 minutes.

The hot material is directed to extruder 7 of conventional desing wherein it is formed into a cylindrical rod of ¾ of an inch in diameter and cut into pieces about 2 inches in length. The shape of the pieces is not important. However, it is preferred that the smallest dimension of the pieces be at least ⅛ inch, preferably at least ¼ inch.

Although extrusion through a die is a preferred method for shaping the material, it is obvious that other techniques can be used such as pressing the material into a mold. Whether extrusion or other shaping technique is used, it is only necessary to apply enough compressive force to yield a piece which is self-sustaining so that it retains its integrity during handling.

The shaped pieces are placed in block 8 which is a device for administering flour to the surface of said piece. The device consists of a vibrating trough partially filled with the crusting material. The vibration of the apparatus conveys the pieces and effects a uniform covering. In addition, the vibratory action forces the crusting material into surface crevices so that the final product has a smooth surface. Other methods of applying the crust will be evident to those skilled in the art.

To secure the crust on the surface of the rice material, the so-coated pieces are blanched with steam at 212° F. for 1–3 minutes in block 9. The pieces can be conveyed through the blancher by means of a belt or tray, the speed of which is adjusted so that the proper blanching period is maintained.

The processes occurring in blocks 8 and 9 can be repeated any number of times until a crust of sufficient thickness is obtained.

Following the blanching, the coated pieces are par-fried in an edible oil in block 10 at about 350° F. for 1–5 minutes. This step develops the proper color, flavor, and texture in the crust, reduces the moisture level, and prepares the pieces such that they may be conveniently reheated in the oven by the consumer. Therefore, the length of the par-fry will be dependent on these factors.

In an alternate embodiment of the invention, the pieces are first directed to block 11 wherein they are heated before par-frying. A preferred method involves the use of conventional infrared heaters. The pieces are subjected to radiant heat for about 1–2 minutes while being constantly rotated to insure that all surfaces are exposed. The use of infrared heat has the advantage that the final fried products exhibit a particularly desirable crisp exterior, completely free from any toughness or leatheriness. On the other hand, the pieces may be conveyed through a chamber wherein they are exposed to a current of hot air at about 200–300° F., preferably at 250° F. Although the results from the use of this procedure are not as good as those from infrared heat, the application is much simpler. Consequently, the latter method is more suitable for larger operations.

The so-heated pieces are then par-fried in block 12 in an edible oil at 350° F. Since the crust has already been preheated, a par-fry time of about 30–180 seconds is adequate to finish the crust development.

To preserve the pieces for further use, they are frozen in freezer 13 in the conventional manner, e.g., in an air-blast freezer, and held in frozen storage until needed for ultimate use.

The products can be held in frozen storage indefinitely without deterioration. An important factor is that the freezing does not cause the individual pieces to adhere together; the pieces remain separate even where they are in close contact. This is a very useful attribute of the products—it permits the user to readily remove any desired portion from a package of the frozen pieces. It is further to be noted that the pieces retain their integrity; they do not crumble or break apart but are able to withstand the usual stresses encountered in packaging, shipping, and other handling operations.

To prepare the frozen products for the table, they are heated in an oven—for example, at about 450° F. for 10–12 minutes. The resulting fried products have a proper golden-brown color, a crisp exterior, soft interior, and excellent taste.

The invention is further demonstrated by the following illustrative examples.

EXAMPLE 1

Beef-flavored pre-fried rice product

Rich, 1 kg. (approximately 87% solids content), was soaked in 1 kg. of water at 70° F. for 30 minutes, separated from excess water, and steamed in a conventional manner for 12 minutes at 212° F. At this point the rice had absorbed 250 g. of water (approximately 30% moisture level).

This partially cooked rice was soaked in 1 kg. of water at 190° F. for 5 minutes. The excess water was separated, and the rice was steamed for 5 minutes at 212° F. The absorbed water now totalled 1480 g. (or approximately 65% moisture).

Said steamed rice was lightly blended with 120 g. of soy flour, 100 g. of pinto bean powder, and 500 ml. of water and steamed for 10–15 minutes. Other ingredients, the amounts of which are outlined in the accompanying table, were added; and the mixture was allowed to stand for 5–10 minutes to allow the flavor components to diffuse throughout. During this period the temperature was maintained at 160–170° F. by intermittent heating with steam.

| Ingredient: | Weight (g.) |
|---|---|
| Onion, dehydrated, minced | 25 |
| Vegetable hydrolysate | 30 |
| Garlic powder | 0.75 |
| Salt | 50.0 |
| Monosodiumglutamate | 2.0 |
| Black pepper, ground 30 mesh | 1.25 |
| Ginger, ground | 0.4 |
| Emulsifier | 4.0 |

The hot material was extruded in a conventional apparatus and cut into pieces 2 inches in length x ¾ inch in diameter. Potato flakes were ground into a powder and placed in a vibrating trough. The so-formed pieces of rice product were directed through the potato flour so that a thin coating was applied to the surface. Said pieces were then blanched with steam at 212° F. for 2 minutes. After cooling, the pieces were again conveyed through the flour and blanched with steam at 212° F. for 2 minutes.

Following this operation, the pieces were heated with infrared heat for 2 minutes while being slowly rotated.

Finally, the so-heated pieces were fried in an edible oil at 350° F. for 2 minutes, cooled, and frozen in a blast freezer at −34° F.

For taste judgments, the frozen pieces were warmed in an oven at 450° F. for 10 minutes. Approximately 40 persons tasted and rated the products, which were judged to have an excellent flavor, a crisp exterior, and a soft, but not mushy, interior.

EXAMPLE 2

Chili-flavored pre-fried rice product

The procedure outlined in Example 1, with the exception that the crust was made of pinto bean flour, was followed; the ingredients are summarized below.

| Ingredients: | Weight (g.) |
|---|---|
| Water | 1500.0 |
| Rice, long grain | 500.0 |
| Soy flour | 60.0 |
| Pinto bean powder | 50.0 |
| Onion, dehydrated | 12.5 |
| Vegetable hydrolysate | 15.0 |
| Garlic powder | 0.5 |
| Salt | 25.0 |
| Monosodium glutamate | 1.0 |
| Black pepper, ground 30 mesh | 0.625 |
| Ginger, ground | 0.2 |
| Emulsifier | 2.0 |
| Chili powder | 5.0 |
| Bell pepper, dehydrated, diced | 12.5 |
| Tomato paste | 50.0 |

The oven-warmed product was judged to be of excellent flavor and texture.

EXAMPLE 3

Chili-flavored pre-fried rice product

The rice (500 g.) was soaked in excess water for 30 min. and steamed at 212° F. for 12 min. Excess water was removed and the rice, 12.5 g. of bell pepper, 0.2 g. of ground ginger, and 12.5 g. of dehydrated onion, were placed in 1 kg. of water at 200° F. This mixture was stirred intermittently and held at 200° F. for 7 min. Additional ingredients (outlined below) were added and this mixture was maintained at 200° F. for 10 min. with slow stirring.

| Ingredients: | Weight (g.) |
|---|---|
| Soy flour | 60.0 |
| Vegetable hydrolysate | 15.0 |
| Garlic powder | 0.5 |
| Salt | 25.0 |
| Monosodium glutamate | 1.0 |
| Black pepper, ground 30 mesh | 0.625 |
| Emulsifier | 2.0 |
| Chili powder | 5.0 |
| Tomato paste | 50.0 |

Finally, 50 g. of pinto bean powder was added and the entire mixture was intermittently stirred at 200° F. for 2 min.

The cooked material was then treated as described in Example 1. The final product was judged to have excellent flavor and texture.

EXAMPLE 4

Beef-flavored pre-fried rice-wheat product

The procedure outline in Example 1 was followed; the ingredients are listed below.

| Ingredients: | Weight (g.) |
|---|---|
| Water | 150 |
| Rice, long grain | 50 |
| Wheat | 50 |
| Milk, dry non-fat | 5 |
| Pinto bean powder | 20 |
| Beef bouillon | 3.5 |
| Onion powder | Trace |

The oven-warmed product was judged to be of excellent flavor and texture.

Having thus described our invention, we claim:

1. A process for preparing pre-fried food products with a cereal grain base, which comprises
   (a) hydrating to a moisture content of about 65%, gelatinizing, and partially cooking cereal grain,
   (b) mixing said grain with other edible ingredients,
   (c) finish-cooking the said mixture,
   (d) molding the said mixture into conveniently dispensable forms,
   (e) coating the resulting product with a flour and cooking with steam for a period sufficient to partially cook said flour and to form a crust which adheres to the product during subsequent frying operations, and
   (f) par-frying and so-formed product in an edible oil such that a desired color, texture, flavor, and moisture level are attained.

2. The process of claim 1 wherein the cereal grain is rice.

3. The process of claim 1 wherein the cereal grain is wheat.

4. The process of claim 1 wherein the cereal grain is oats.

5. The process of claim 1 wherein the cereal grain is barley.

6. The process of claim 1 wherein the cereal grain is corn.

7. The process of claim 1 wherein in Steps (a) and (c) the cooking is with steam at 212° F.

8. The process of claim 1 wherein the grain in Step (a) is hydrated, gelatinized, and partially cooked by
(a) soaking the grain in water at 70–140° F. for 10–30 minutes,
(b) separating the excess water,
(c) heating the so-treated grain with steam at 212° F. for about 5–10 minutes,
(d) soaking said grain in water at 70–190° F. for approximately 10–20 minutes,
(e) separating the excess water, and
(f) heating the so-treated grain with steam at 212° F. for about 5–10 minutes.

9. The process of claim 1 wherein the flour crust in Step (e) is prepared from potato flakes.

10. The process of claim 1 wherein the flour crust in Step (e) is prepared from pinto beans.

11. The process of claim 1 wherein the cooking in Step (e) is accomplished with steam at 212° F. for 1–2 minutes.

12. The process of claim 1 wherein the coating and cooking operations in Step (e) are repeated until a coating of sufficient thickness is obtained.

13. The process of claim 1 wherein the product in Step (f) is par-fried in edible oil at about 350° F. for 1–5 minutes.

14. The process of claim 1 wherein the product in Step (f) is heated by means of infrared heat for 1–2 minutes prior to the par-fry.

15. The process of claim 1 wherein the product in Step (f) is heated by means of hot air at about 200–300° F. for 1–5 minutes prior to the par-fry.

References Cited
UNITED STATES PATENTS

| | | | |
|---|---|---|---|
| 3,457,080 | 7/1969 | Watkins | 99—83 X |
| 3,532,509 | 10/1970 | Gronberg | 99—83 |
| 3,544,332 | 12/1970 | Leebens | 99—83 |
| 3,650,766 | 3/1972 | Smadar | 99—83 X |

RAYMOND N. JONES, Primary Examiner

U.S. Cl. X.R.
99—80 R